No. 766,082. PATENTED JULY 26, 1904.
S. P. WATT.
COMBINATION TOOL.
APPLICATION FILED APR. 29, 1902.
NO MODEL. 2 SHEETS—SHEET 2.
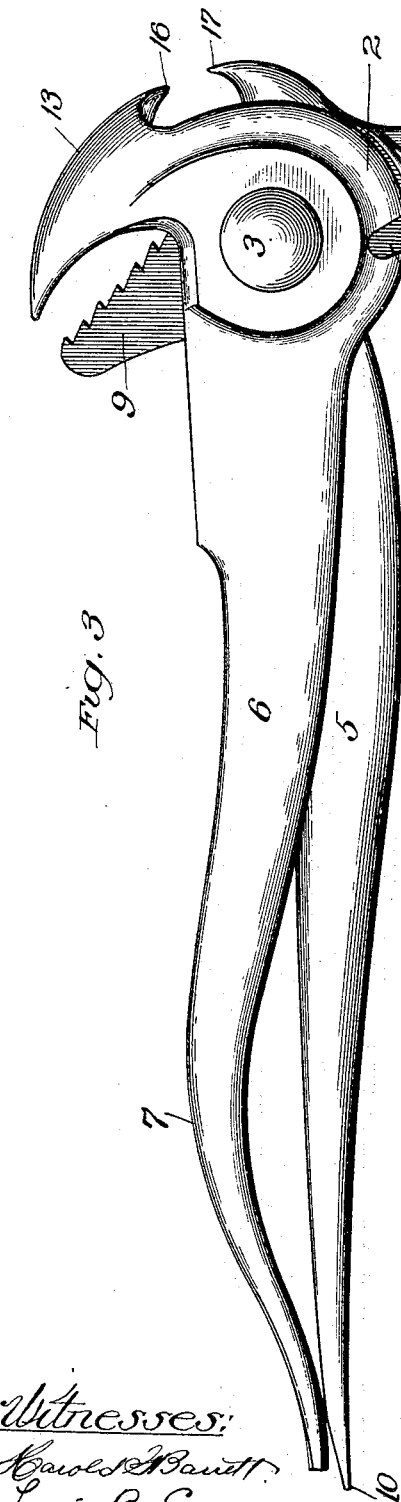
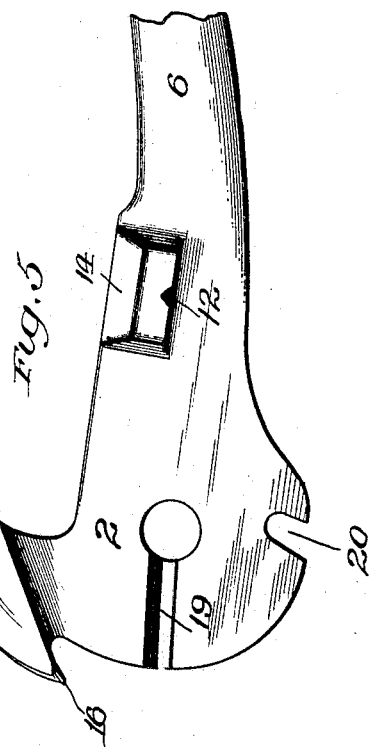
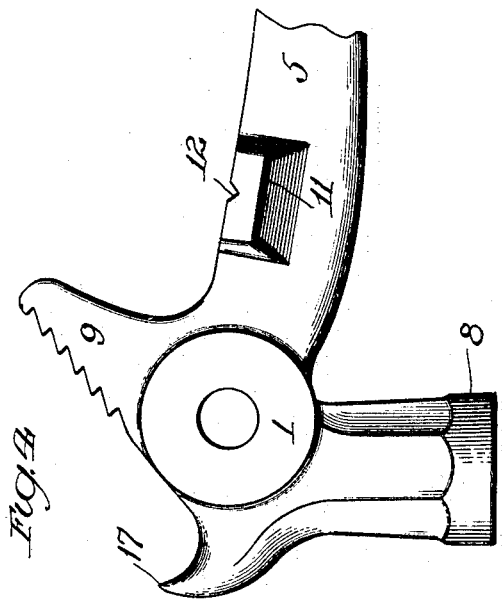

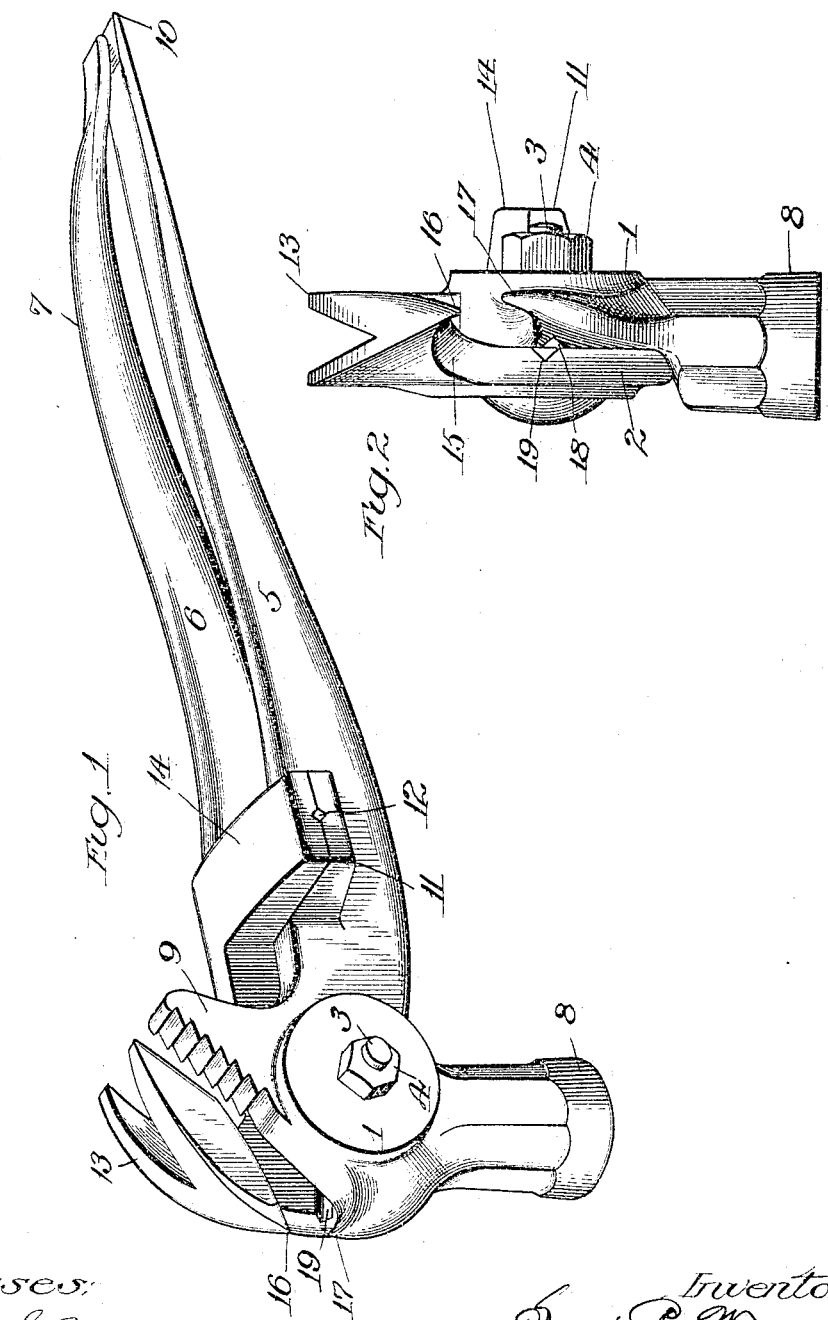

No. 766,082. Patented July 26, 1904.

UNITED STATES PATENT OFFICE.

SERN P. WATT, OF MORGAN PARK, ILLINOIS, ASSIGNOR TO HINE-WATT MANUFACTURING COMPANY, OF CHICAGO, ILLINOIS, A CORPORATION OF ILLINOIS.

COMBINATION-TOOL.

SPECIFICATION forming part of Letters Patent No. 766,082, dated July 26, 1904.

Application filed April 29, 1902. Serial No. 105,246. (No model.)

*To all whom it may concern:*

Be it known that I, SERN P. WATT, a citizen of the United States, residing at Morgan Park, in the county of Cook and State of Illinois, have invented a certain new and useful Improvement in Combination-Tools, of which the following is a specification.

My invention has for its object the production of a combination-tool which shall be efficient and reliable as well as inexpensive considering the number of various tools embodied in the single structure.

The features of advantage will be apparent from the description hereinafter given.

In the drawings, Figure 1 is a perspective view of my combination-tool; Fig. 2, a front end elevation thereof; Fig. 3, a side elevation of the entire tool; Fig. 4, an elevation of a portion of one of the members of the tool, and Fig. 5 a similar view of the other member.

My combination-tool comprises two members 1 and 2, which are pivoted on each other in suitable manner, as by the bolt 3 and nut 4. The two members, respectively, have handle portions 5 and 6, the latter of which is somewhat raised or swelled at 7 to provide a suitable grip. The member 1 is provided with the face portion 8 of a hammer and also provided with a serrated or toothed upwardly and rearwardly projecting extension 9 above the pivotal point. The handle 5 is preferably a little longer than the handle 6, Fig. 3, and is provided with a screw-driver point or end 10. Extending laterally from the handle 5 is a jaw 11 of a pair of pliers, which jaw may be made like the jaws of ordinary pliers and provided with a groove 12. The other member 2 is provided above the pivotal point with a claw forming a nail-puller 13, whose rearward face is upwardly inclined or curved and is in proximity to the serrated extension 9, which in combination with the body of the nail-puller constitutes a pipe-wrench. This member is provided with the second jaw 14, which is similar to and coöperates with the jaw 11 to form the pliers. The member 2 is cut away on its inner side in order that its upper portion or the body of the nail-puller will overhang the pipe-wrench. Such member is also cut away at 15, so as to form a pointed hook or bill 16, which when the handles 5 and 6 are spread apart is brought into coöperation with a similar pointed hook or bill 17 on member 1, as clearly shown in all the figures of the drawings. These hooks constitute a staple-puller.

As shown in Fig. 2, the adjacent faces of the members 1 and 2 at the front thereof are provided with the preferably angular grooves 18 and 19, respectively, which are arranged to fully register when the handles 5 and 6 are slightly separated, so as to form a socket or chuck to receive and hold small tools, such as drills and screw-drivers, which may be inserted in such chuck.

Referring to Figs. 3 and 5, the member 2 has on its lower edge below its pivot a recess 20, which when the handles are closed lies within the flat face or side of the member 1 just above the face 8 of the hammer, which is extended to the left, Fig. 2, so as to afford the proper size thereto and also to balance the tool. This recess in connection with the sharp cutting edge of member 1 constitutes a wire-cutter.

After the above description the operation of the various well-known tools will be perfectly apparent without the necessity of any explanation. It may be stated, however, in the way of pointing out the advantages of my combination-tool that such tool has been designed and constructed with a view to the attaining of the same results as the usual separate tools and to the proper balancing of the entire structure. Moreover, I have made the tool easy and solid of grasp by the hand, so that it may be most efficient.

I claim—

1. A combination-tool comprising two members pivoted to each other and provided with grooves on their inner and adjacent faces which move upon each other, which grooves are adapted to register to receive a suitable tool and to hold the same by angular movement of one member on the other.

2. A combination-tool comprising two members having handles and pivoted to each other provided with grooves extending to the edge of the tool and lying in a plane which lies at right angles to the axis of rotation of said members, said grooves being adapted to receive a suitable tool when the handles are separated and to hold the tool when the handles are brought together.

3. A combination-tool comprising two members pivoted to each other, one of said members having a hammer portion, a serrated extension, and a bill on its front portion, and the other member having a recess forming a wire-cutter in combination with the other member and also having a coöperating serrated extension and a bill.

4. A combination-tool comprising two members 1 and 2 pivoted at 3 and having handles 5 and 6, the member 1 having a lower extension 8 forming a hammer and an upper extension 9 forming a jaw of a pipe-wrench, plier-jaws 11 and 14 on the handles, the other member 2 having a nail-puller extension 13 serving as the other jaw of pipe-wrench.

5. A combination-tool comprising two members 1 and 2 pivoted at 3 and having handles 5 and 6, the member 1 having the hammer 8, pipe-wrench jaw 9 and also having the plier-jaw 11, and the other member 2 having the nail-puller extension 13 whose lower face is adjacent to and coöperates with the jaw 9 of the pipe-wrench, the handle 6 being swelled at 7 to form a suitable grip for the hand.

6. A combination-tool comprising two members 1 and 2 pivoted at 3 and having handles 5 and 6 the said member 1 having the hammer 8, pipe-wrench jaw 9, plier-jaw 11, screw-driver 10 at the end of its handle and also the bill or hook 17, and the other member having an extension 13 forming a nail-puller and the other jaw of the pipe-wrench and terminating in a bill or hook 16 coöperating with hook 17 to form a staple-puller, said member 2 also having a recess 20 at its lower edge to coöperate with the other member to form a wire-cutter.

7. A combination-tool comprising two members pivoted to each other and having portions or surfaces adjacent their pivotal point which move or slide over each other, said surfaces having tool-receiving grooves which register when the members are in one position but which move past or away from each other when the members are in a different position.

SERN P. WATT.

Witnesses:
S. E. HIBBEN,
E. B. HAYES.